Jan. 20, 1942. P. T. FARNSWORTH Re. 22,009

ELECTRON IMAGE AMPLIFIER

Original Filed June 14, 1930 2 Sheets-Sheet 1

INVENTOR,
PHILO T. FARNSWORTH.
BY Donald K. Lippincott
ATTORNEY

ELECTRON IMAGE AMPLIFIER

Original Filed June 14, 1930 2 Sheets-Sheet 2

INVENTOR,
PHILO T. FARNSWORTH.
BY Donald K. Lippincott
ATTORNEY

Reissued Jan. 20, 1942 Re. 22,009

UNITED STATES PATENT OFFICE 22,009

ELECTRON IMAGE AMPLIFIER

Philo T. Farnsworth, Springfield Township, Montgomery County, Pa., assignor, by mesne assignments, to Farnsworth Television & Radio Corporation, Dover, Del., a corporation of Delaware Original No. 2,085,742, dated July 6, 1937, Serial No. 461,110, June 14, 1930. Application for reissue July 5, 1939, Serial No. 282,952

34 Claims. (Cl. 178—7.2)

My invention relates to apparatus for the electrical projection of pictures, as in television, facsimile transmission, and the like, and particularly to such apparatus as is used in connection with electrical scanning systems.

Among the objects of my invention are: First, to provide a method of increasing the sensitivity of television transmission cells to permit the projection of television pictures by reflected light of ordinary intensity; second, to increase the electrical output of a television cell in order to provide satisfactory television signals without the use of extremely sensitive amplifiers; third, to provide a television system wherein an amplification of an electrical image, or a portion thereof, may be accomplished without dissecting said image into picture elements; fourth, to provide a method of amplification for television purposes wherein the degree of amplification is not limited by the extremely high frequencies which must be handled where the image is dissected before amplification; fifth, to provide a means whereby relatively large currents may be secured from a television transmitting cell without interference from space charge effect; sixth, to provide an image amplifying element which is simple and practical to construct; and seventh, to provide an amplifier for photo-electric currents wherein extremely high amplifications may be obtained with extremely simple apparatus external to the tube itself, and in a single stage.

My invention possesses numerous other objects and features of advantage, some of which, with the foregoing, will be set forth in the following description of my invention. It is to be understood that I do not limit myself to this disclosure of species of my invention, as I may adopt variant embodiments thereof within the scope of the claims.

In my previous co-pending applications for United States Letters Patent, including applications Serial No. 159,540, filed January 7, 1927 (Patent No. 1,773,980), Serial No. 245,334, filed January 9, 1928, and Serial No. 270,673, filed April 17, 1928, I have described a television transmitting apparatus and system wherein an optical image of the pictured field is thrown upon a photosensitive cathode, and the emitted electrons are accelerated and focused magnetically to form an electrical image, i. e., a plane through which an electron stream passes, the electron density of which varies spatially across the stream in the same manner as the illumination density varies across the optical image. In this specification and claims the terms "electrical image," or, more specifically "electron current image," will therefore be used to indicate an electron stream wherein the current density is simultaneously proportional and corresponds in relative position to a plurality of adjacent elementary areas of a corresponding optical image.

The electron stream forming this image may be deflected, preferably by magnetic means, to pass over an aperture in such a manner as to effect a scanning of the image, that portion of the electron stream which passes through the aperture forming a picture current which may be amplified and modulated upon a radio wave or transmitted by wire.

This method of television transmission offers the advantage of having no moving parts, and of being suitable for the electrical projection of pictures having any desired fineness of detail.

The principal weakness of this method lies in the fact that only a relatively small portion of the electrons emitted from the photo-sensitive surface are used at any given instant, and therefore extremely photo-sensitive screens and amplifiers are necessary in order to transmit satisfactory pictures.

When it is attempted to amplify the picture currents above a certain level, background noise, "Schottke effect" and other ordinarily negligible factors come in to make the amplified picture currents unsatisfactory and distorted.

In the present invention the fundamental principle of my previous invention is retained, i. e., an electrical image corresponding to the optical image is formed; in the present device, however, instead of first dissecting the image into picture elements and amplifying the resultant current, a plurality of picture elements are simultaneously amplified before the image is dissected, or, at least, before it is completely dissected.

Describing this invention in general terms, means are provided for forming an electrical image of the pictured field as in my previously described devices. The electrical image, or a portion thereof, is received upon a plurality of isolated control elements, which regulate the electron flow from a second cathode, preferably of the thermionic type, to form a secondary electrical image which varies in consonance with the primary image. In the preferred form of the device the primary electrical image is deflected in accordance with a predetermined time schedule, preferably at the low, or "picture frequency" scanning rate, across a linear aperture in a diaphragm situated substantially in the focal plane of the electrical image. The aperture diaphragm may be termed an "electrical shutter." The thermionic cathode is also linear, extending back of and parallel with the linear aperture. Encircling the cathode is a winding comprising discontinuous turns of very fine wire, each turn forming in effect a grid or control electrode whose potential is determined by the number of electrons reaching it through the aperture of the diaphragm. An anode screen positioned adjacent the linear cathode accelerates the electrons which it emits, these electrons being focused as in the case of the primary image in a second focal plane, and since the potential of the isolated control elements varies spatially in consonance with the primary electrons falling upon them, a very greatly amplified secondary image is formed.

Where this device is being used for its primary purpose, i. e., as a television transmitter, the secondary image is deflected, in the direction of its length and at the high scanning frequency of the picture to be transmitted, across an aperture behind which a target for receiving electrons is positioned. The electrons flowing upon this target comprise a picture current, which may be amplified as has previously been described in my above mentioned applications.

Owing to the extremely small capacity of the elementary control electrodes which govern the formation of the secondary image, and owing to the fact that these elements vary in potential at a much lower rate than the higher picture component frequencies which must be transmitted, extremely high amplifications are obtainable from the device, the secondary electron image having an electron density 10,000 or more times as great as that of the primary image. This makes it possible to transmit pictures by reflected light, or, where it is desired to transmit pictures from moving picture film, greatly to reduce the amplification necessary external to the transmitting apparatus.

Referring to the drawings.

Figure 1:
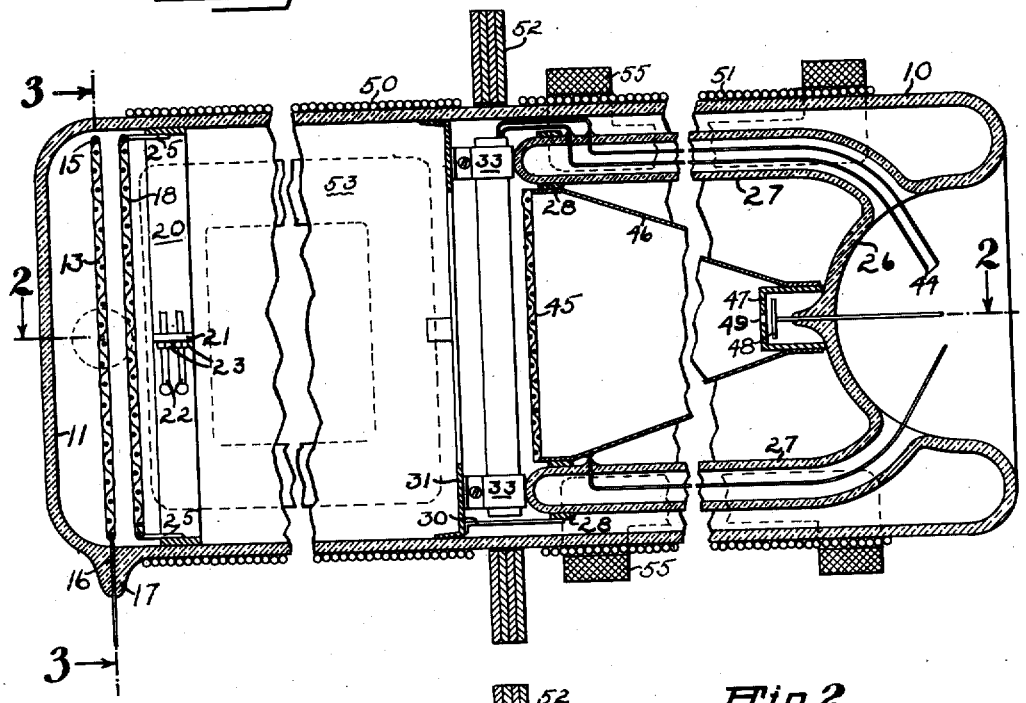
Figure 1 is an axial sectional view of a television transmitting tube embodying my invention.
Figure 2:
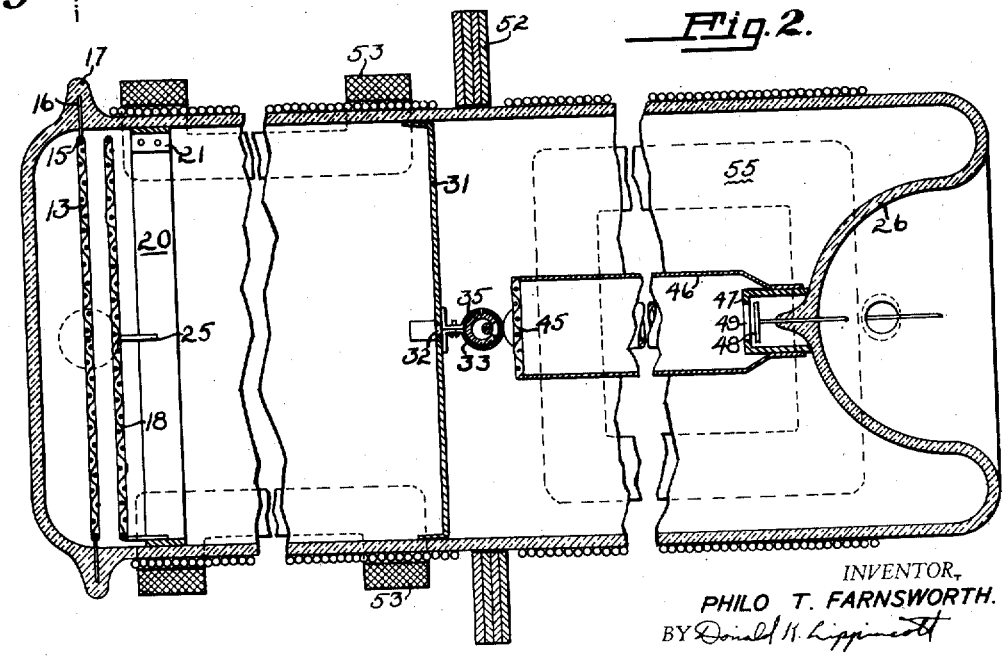
Figure 2 is a similar sectional view, the plane of section being perpendicular to that of Figure 1, as indicated by the line 2—2 of the first figure.
Figure 3:
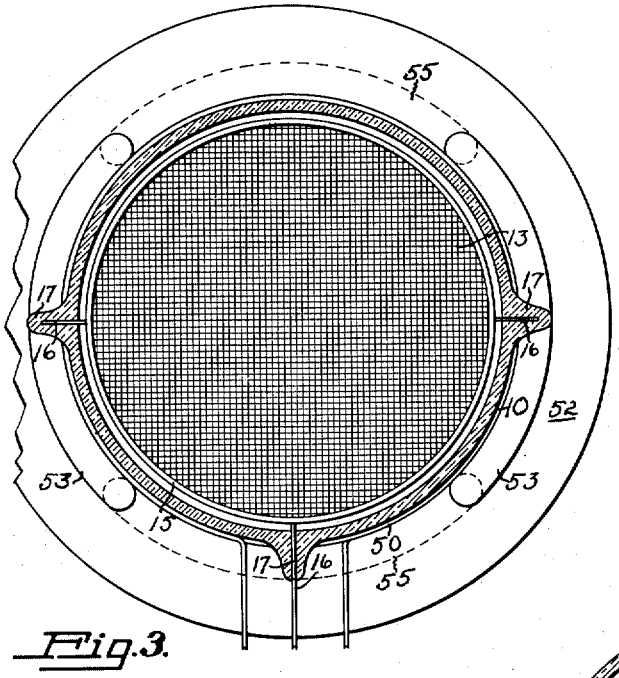
Figure 3 is a transverse sectional view, taken in the plane indicated by the line 3—3 of Figure 1.
Figure 4:
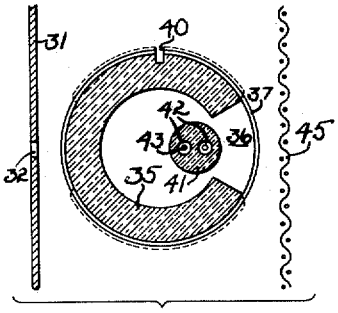
Figure 4 is an enlarged detail section of a portion of Figure 2.
Figure 5:
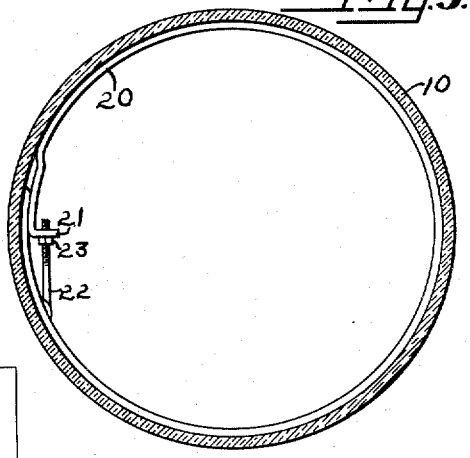
Figure 5 is a transverse sectional view showing the expanding ring for supporting the anode.

In detail, a preferred embodiment of my invention comprises an envelope 10, of substantially tubular form, having at one end a substantially flat window 11 through which an optical image may be projected by a suitable lens 12. In a position closely parallel to this window is a photo-sensitive cathode, comprising a screen 13 of fine wire netting, stretched on a ring 15 which is supported by radial wires or pins 16 secured to the envelope by seals 17. Deposited upon the screen is a suitable photo-active material such as potassium hydride, caesium, or other suitable medium.

Parallel and closely adjacent to the cathode is the similar anode screen 18, preferably of finer wire than the cathode screen. The anode may be supported upon an expanding ring comprising a strap 20, one end of which is bent inward to form a flange 21. A pair of small bolts 22, welded to the other end of the strap, engage holes in the flange, and by tightening the nuts 23, the ring is expanded into frictional engagement with the wall of the envelope. Support wires 25 are welded to the anode screen and to the expanding ring to hold the screen in position.

The inner surface of the envelope is preferably platinized or silvered from the expanding ring back to the opposite end of the tube, and the ring makes contact with the metallic surface, which thus provides an equipotential space through which the electrons may travel after being accelerated from the cathode by the anode.

A stem 26 is sealed into the end of the envelope opposite to the window, and carries a pair of arms 27 which project substantially half the length of the envelope and closely adjacent its walls. Surrounding the ends of each of these arms is a band 28, welded to each of which is a wire 30 for supporting a diaphragm 31. A linear slit 32 extends across the diaphragm.

The image amplifier element is mounted on the diaphragm behind the slit, by means of the collars 33. This element comprises a tube 35, formed of porcelain or other suitable refractory insulating material, and having a longitudinal slot 36 formed in the side opposite the diaphragm. The tube is wound with fine wire 37. In one of these devices which I have constructed, this winding comprises tungsten wire, .0003 inch in diameter, and wound 240 turns to the inch.

After the tube is wound the winding is partially coated with material for insulating it and connecting it to the porcelain tube. This insulating material may be vitreous enamel, alundum cement, or other suitable refractory. In applying the cement, that portion of the winding immediately behind the slit in the diaphragm is left bare, as is that portion covering the slot 36. After the cement coating has set a saw-cut 40 is made, extending the length of the tube, to separate the winding into individual discontinuous turns.

A thermionic cathode 41 extends the length of the tube behind the slot 36. This cathode may be formed of a silicon rod having a pair of parallel perforations 42 extending the length thereof, and a filamentary heater 43 threaded through the perforations. The exterior of the rod is first platinized, then coated with alkaline-earth oxide or other suitable electron emitting material, and is grounded to one end of the heater 43. A pair of leads 44 for supplying current to the heater is carried out of the envelope through one of the arms 27.

A second anode 45, also of screen construction, is supported from the bands 28 closely adjacent to the slot 36. The anode covers, and is electrically continuous with a flat, funneled shaped shield 46 whose smaller end terminates adjacent the stem 26 in an inner shield or capsule 47. The capsule covers a target 48, and is provided with an aperture 49 which is preferably an elongated slot which lies in a plane perpendicular to the diaphragm slit 32.

Surrounding the envelope are two solenoidal focusing coils 50 and 51. These coils carry direct current for focusing the electron images as is described in my copending application, Serial No. 270,673 above mentioned. Each electron leaving the cathode, at an angle diverging from the direction of the magnetic field, describes a helical path, returning to tangency with the line of force through its source in the same time as every other electron. The current in the solenoids is adjusted to bring the planes of tangency, i. e., the electrical image coincident with planes of the scanning apertures 32 and 49 respectively.

Figure 6:
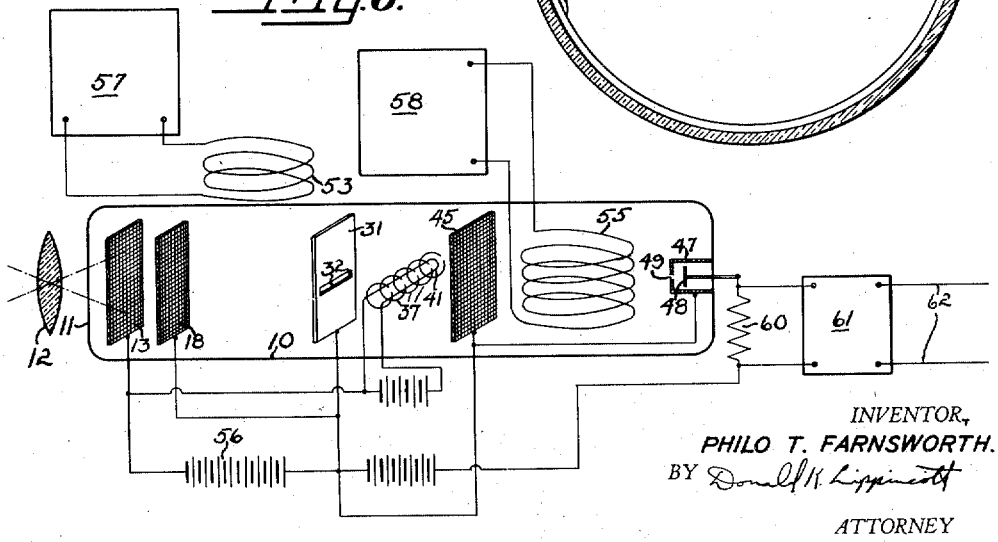
Figure 6 is a schematic diagram showing the principal electrical circuits used in connection with the device.

The two coils may be replaced by a single coil if desired, but separate coils are preferred since the currents therein may be individually adjusted, so that less accurate spacing of the elements in the transmitting device is required. A magnetic shield 52, which may be built up of rings of Swedish iron or other highly permeable material, preferably surrounds the tube between the two coils. For the sake of clearness, neither the focusing coils nor the shields are shown in the diagram of Figure 6.

On the side of the shield toward the window in the envelope is a pair of deflecting coils 53. It will be noted that these coils cause a deflection of the electron image formed by the photo-sensitive cathode in a direction perpendicular to the slit 32, and are at right angles to the position which they would occupy were the focusing coils 50 and 51 not used. A second set of deflecting coils 55, spaced 90° from the coils 53, is provided on the opposite side of the magnetic shield 52. These coils deflect the secondary image perpendicularly to the primary image deflection. Each set of coils is represented by a single coil in the schematic diagram.

In operation, the optical image is focused upon the cathode 13, which emits electrons in proportion to its illumination. These electrons are drawn through the cathode and accelerated by the potential applied to the anode from the battery or other source 56, most of them passing through the anode screen and traveling longitudinally of the envelope at a high velocity, to be focused in the plane of the diaphragm 31 by the longitudinal magnetic field from the coil 50. The electron image formed in the plane of the diaphragm is deflected across the slit 32, which acts as a scanning aperture, at a frequency of from 12 to 20 cycles per second by means of the magnetic field of the coils 53, which are supplied by an oscillator 57.

The oscillator is preferably a generator of sloped or saw-tooth waves, as is described in the co-pending application of Farnsworth and Lubcke, Serial No. 449,985, filed May 5, 1930. The field thus produced causes the image to travel across the slit relatively slowly in one direction, and then to return to its original position with great rapidity, after which the cycle is repeated.

A portion of the electrons forming the electrical image pass through the slit and are intercepted by the grid wires 37. The individual wires being isolated, and having extremely small capacity, can vary in potential relatively rapidly owing to the leakage through the porcelain tube 35 and the residual gas remaining in the envelope. For example, if the slit is 1/200 as wide as the image, and if a scanning frequency of 20 cycles is used, the maximum frequency with which the wires need vary in potential is 2,000 cycles per second.

Since each turn of the winding 37 is insulated from its fellows, adjacent turns may have widely different potentials, depending upon the number of electrons falling thereon, and therefore the electrons attracted from the cathode toward the secondary anode 45 vary spatially in consonance with the electrons in falling through the slit 32 from the primary electron image. The secondary electron image is, of course, negative; i. e., it has a minimum electron density where the primary image has a maximum density, and vice versa.

The secondary image is, moreover, astigmatic. The electron source is effectively the entire width of the slot 36, and since the individual turns of the winding 37 are substantially perpendicular to this slot, and each governs the electron flow passing its entire length, the image formed is the electrical equivalent of a photographic negative of the slit viewed through a cylindrical lens, i. e., the slit 32 is much broadened as it is represented by the secondary electron image. This may be avoided if desired by making the openings 32 and 36 of the same width, but in general the astigmatic image is a great advantage; the electrons emitted by the thermionic cathode exceed vastly in number those emitted by the photo-sensitive cathode, and the wider image permits the passage of many more electrons before space-charge effect intervenes.

The astigmatic secondary image is focused by the coil 51 in the plane of the inner shield 47. The image is deflected in the direction of its length by a magnetic field from the coils 55, which are excited by a slope-wave oscillator 58, generating a high scanning frequency, e. g., 4,000 cycles per second. The slit or scanning aperture 50 is positioned parallel to the axis of the astigmatism of the secondary image, and therefore all of the electrons controlled by a single grid wire enter the aperture at one time, to fall upon the target 48. These electrons form the picture current which flows through a resistor 60, causing a potential drop which may be amplified by a suitable repeater 61 and transmitted along a line 62 or modulated upon a radio wave.

It will be understood that the operation of the image amplifying device may be modified materially, following the principles that are well known in ordinary vacuum tube practice. The factors which are most readily controlled to accomplish such modification are the various potentials used.

Thus, if the velocity of the electrons forming the primary image be greatly increased, the grid elements may be made to emit secondary electrons in excess of the primaries. Under these circumstances the grid elements become less negative with greater electron density in the primary electrical image, and the secondary image becomes positive instead of negative.

Moreover, if desired, separate leads may be brought out of the tube for the separate anodes and shields, giving almost unlimited flexibility in so far as potential gradients and electron impact velocities are concerned.

The bias potentials of the isolated control elements are not so directly variable, but these may be controlled indirectly by selecting materials of predetermined conductivity for the tube 35, by altering the potential of its supporting bands, to control leakage therethrough, and by variation of the vacuum to which the tube is pumped.

I claim:

1. The method of electrical picture projection which comprises the steps of forming an electron current image of an object, dissecting said image into strips of elementary width, and applying the strips of said electron charge image to control the intensity distribution of a space current of elongated cross-section to form successive partial images of greater intensity.

2. The method of electrical picture projection which comprises the steps of forming an electron current image of an object, dissecting said image into successive strips of elementary width, applying the strips of said electron current image control a space current to form corresponding partial electron current images of greater intensity, and dissecting said partial images into elementary areas.

3. The method of electrical picture projection which comprises the steps of forming an electron current image of an object, and utilizing successive portions of said image to control the spatial distribution of an electron flow in consonance with linear strips of elementary width of said electron current image to form a succession of secondary partial electron current images corresponding to said strips.

4. The method of electrical picture projection which comprises the steps of forming an electron current image of an object, deflecting said image in accordance with a predetermined time schedule, intercepting a portion of said image, and utilizing the intercepted portion to control the spatial distribution of an electron flow to form a varying secondary image corresponding to the intercepted portion of said first-mentioned electrical image.

5. The method of electrical picture projection which comprises the steps of forming an electron current image of an object, deflecting said image in accordance with a predetermined time schedule, intercepting a portion of said image, utilizing the intercepted portion to control the spatial distribution of an electron flow to form a varying secondary electrical image corresponding to said intercepted portion, deflecting said secondary image in accordance with a different time schedule, and intercepting a varying portion of said secondary image to effect a scanning of the object.

6. The method of electrical picture projection which comprises the steps of forming an electron current image of an object, deflecting said image in one dimension, intercepting strips of elementary width across said image, controlling the spatial distribution of an electron flow in consonance with the intercepted portion to form a secondary electron current image, and deflecting said secondary image in a second dimension.

7. The method of electrical picture projection which comprises the steps of forming an electrical image of an object, deflecting said image in one dimension, intercepting a linear area of said image, controlling the spatial distribution of an electron flow in consonance with the intercepted portion to form a secondary electron image, and deflecting said secondary image in a direction parallel to its length.

8. In an apparatus for the electrical projection pictures, means for forming an electrical image, means for selecting a substantially linear area from said image, means for deflecting the image normally to said area to vary the area selected, a substantially linear source of electrons, and means for varying the electron flow from elementary lengths of said source in accordance with the intensity distribution of the selected area to form a secondary image.

9. In an apparatus for the electrical projection of pictures, means for forming an electrical image, means for selecting a substantially linear area from said image, means for deflecting the image normally to said area to vary the area selected, a substantially linear source of electrons, means for varying the electron flow from elementary lengths of said source in accordance with the intensity distribution of the selected area to form a secondary image, and means for deflecting said secondary image in a direction parallel to its length.

10. In an apparatus for the electrical projection of pictures, means for forming an electrical current image, an apertured plate arranged substantially in a plane of said image, an emitter of electrons arranged behind the aperture in said plate, means for deflecting said image across said aperture, a control element positioned to derive its potential from the image elements passing through said aperture and to control electron flow from said emitter in consonance with said potential, and means for collecting said electron flow.

11. In an apparatus for the electrical projection of pictures, means for forming an electrical current image, an apertured plate arranged substantially in a plane of said image, means for causing the aperture in said plate to scan said image, an emitter of electrons arranged behind said aperture, means for collecting the emitted electrons, and a control element positioned to derive its potential from the image elements passing through said aperture and to control electron flow from said emitter in consonance with said potential.

12. In an apparatus for the electrical projection of pictures, means for forming an electrical current image, an apertured plate arranged substantially in a plane of said image, an emitter of electrons of greater than elementary length in at least one dimension, arranged behind the aperture in said plate, means for accelerating the emitted electrons to form a secondary electrical image, and a plurality of isolated control elements positioned to derive their potentials from the image elements passing through said aperture and to control said secondary image in consonance with said potentials.

13. In an apparatus for the electrical projection of pictures, means for forming an electrical current image, an apertured plate arranged substantially in a plane of said image, an emitter of electrons arranged behind the aperture in said plate, means for accelerating the emitted electrons to form a secondary electrical image, a plurality of isolated control elements positioned to derive their potentials from the image elements passing through said aperture and to control said electrons to form a secondary image in consonance with said potentials, a second plate having an aperture therein positioned substantially in the plane of said secondary image, and means for causing said apertures to scan said images.

14. In an apparatus for the electrical projection of pictures, means for forming an electrical current image, an apertured plate arranged substantially in a plane of said image, an emitter of electrons arranged behind the aperture in said plate, means for accelerating the emitted electrons to form a secondary electrical image, a plurality of isolated control elements positioned to derive their potentials from the image elements passing through said aperture and to control said emitted electrons in consonance with said potentials to form a secondary electrical current image, a second plate having an aperture therein positioned substantially in a plane of said secondary image, and means for causing said apertures to scan said images in different directions.

15. An electrical discharge device comprising an envelope, a photo-sensitive cathode arranged within the envelope, an anode positioned adjacent the cathode to accelerate electrons liberated therefrom to form an electrical image, a diaphragm positioned in the plane of said image and having a linear aperture formed therein, means arranged behind said aperture for forming a secondary electrical image having a predetermined relationship to that portion of the first image entering the aperture, and a target arranged to intersect said secondary image.

16. An electrical discharge device comprising an envelope, a photo-sensitive cathode arranged within the envelope, an anode positioned adjacent the cathode to accelerate electrons liberated therefrom to form an electrical image, a diaphragm positioned in the plane of said image and having a linear aperture formed therein, means arranged behind said aperture for forming a secondary electrical image having a predetermined relationship to that portion of the first image entering the aperture, a target arranged to intercept said secondary image, and means for deflecting each of said images in accordance with a predetermined time schedule.

17. An electrical discharge device comprising an envelope, a photo-sensitive cathode arranged within the envelope, an anode positioned adjacent the cathode to accelerate electrons liberated therefrom to form an electrical image, a diaphragm positioned in the plane of said image and having a linear aperture formed therein, means arranged behind said aperture for forming a secondary electrical image having a predetermined relationship to that portion of the first image entering the aperture, a target arranged to intercept said secondary image, and means for deflecting each of said images in different dimensions in accordance with a predetermined time schedule.

18. An electrical discharge device comprising an envelope, a photo-sensitive cathode arranged within the envelope, an anode positioned adjacent the cathode to accelerate electrons liberated therefrom to form an electrical image, a diaphragm positioned in the plane of said image and having a linear aperture formed therein, means arranged behind said aperture for forming a secondary astigmatic electrical image of that portion of the first image entering the aperture, a target arranged to receive said secondary image, and a shield for said target having an elongated aperture therein arranged parallel to the axis of astigmatism of said secondary image.

19. An electrical discharge device comprising an envelope, a photo-sensitive cathode arranged within the envelope, an anode positioned adjacent the cathode to accelerate electrons liberated therefrom to form an electrical image, a disphragm positioned in the plane of said image and having a linear aperture formed therein, means arranged behind said aperture for forming a secondary astigmatic electrical image of that portion of the first image entering the aperture, a target arranged to receive said secondary image, a shield for said target having an elongated aperture therein arranged parallel to the axis of astigmatism of said secondary image, and means for deflecting each of said images in dimensions perpendicular to the apertures whereon they fall.

20. An image amplifier element comprising an insulating tube having a longitudinal slot therein, a thermionic cathode mounted longitudinally within said tube, a winding surrounding said tube comprising a plurality of discontinuous turns of wire, and means for retaining said winding in position.

21. An image amplifier element comprising an insulating tube having a longitudinal slot therein, a thermionic cathode mounted longitudinally within said tube, a winding surrounding said tube comprising discontinuous turns of wire smaller in diameter than the elements of the image to be amplified, and means for retaining said winding in position.

22. An image amplifier element comprising an insulating tube having a longitudinal slot therein, a thermionic cathode mounted longitudinally within said tube, a winding surrounding said tube comprising a plurality of discontinuous turns of wire, and an insulating coating partially covering each of said turns and cementing the wire to the tube.

23. An image amplifier element comprising an insulating tube having a longitudinal slot therein, a thermionic cathode mounted longitudinally within said tube, a winding surrounding said tube comprising a plurality of discontinuous turns of wire, and an insulating coating cementing said wire to said tube, a longitudinal band on said winding substantially parallel to said slot being free from said coating.

24. An apparatus for the electrical projection of pictures comprising means for forming an electron current image of the pictured field, a diaphragm arranged in the plane of said electron current image having a linear scanning aperture therein, a thermionic cathode arranged behind said aperture, a plurality of isolated control elements arranged in planes perpendicular to said aperture and substantially surrounding said cathode, an anode screen positioned to accelerate electrons emitted from said cathode to form a secondary electrical image, and means for dissecting said secondary image to form a picture current.

25. An apparatus for the electrical projection of pictures comprising means for forming an electron current image of the pictured field, a diaphragm arranged in the plane of said electron current image having a linear scanning aperture therein of substantially the same length as the pictured field, a thermionic cathode arranged behind said aperture, a plurality of isolated control elements arranged in planes perpendicular to said aperture and substantially surrounding said cathode, an anode screen positioned to accelerate electrons emitted from said cathode to form a secondary electrical image, and means for dissecting said secondary image to form a picture current.

26. An apparatus for the electrical projection of pictures comprising means for forming an electron current image of the pictured field, a diaphragm arranged in the plane of said electron current image having a linear scanning aperture therein, a thermionic cathode arranged behind said aperture, a plurality of isolated control elements arranged in planes perpendicular to said aperture and substantially surrounding said cathode, an anode screen positioned to accelerate electrons emitted from said cathode to form a secondary electrical image, a target positioned to receive said image, and a shield for said target having a scanning aperture therein.

27. An apparatus for the electrical projection of pictures comprising means for forming an electron current image of the pictured field, a diaphragm arranged in the plane of said electron current image having a linear scanning aperture therein, a thermionic cathode arranged behind said aperture, a plurality of isolated control elements arranged in planes perpendicular to said aperture and substantially surrounding said cathode, an anode screen positioned to accelerate electrons emitted from said cathode to form a secondary electrical image, a target positioned to receive said image, and a shield for said target having a scanning aperture therein arranged perpendicular to the plane of said first mentioned scanning aperture.

28. In an apparatus for the electrical projection of pictures, an envelope, a substantially plane window in said envelope, a photo-sensitive foraminated cathode arranged adjacent said window to receive an optical image therethrough, an anode screen adjacent said cathode and substantially parallel thereto, a diaphragm in said envelope having a substantially linear scanning aperture therein and positioned to receive electrons accelerated from said cathode by said anode, and means arranged behind said aperture for initiating an electron stream varying in spatial distribution in consonance with the electron density admitted from the cathode through the aperture.

29. In an electrical discharge apparatus, a substantially linear cathode, a hollow member of insulating material, a plurality of isolated grid elements wound on said member substantially encircling said cathode, and means for directing an electron stream against said grid elements to control the potentials thereof for determining the distribution of electron flow from said cathode.

30. In a cathode ray tube wherein the beam thereof is moved to produce scansion of a picture area, the method of scansion which comprises developing a cathode ray stream representative of a picture, cyclically moving said stream over an aperture to provide scansion in one dimension only, developing a second cathode ray stream representing the result of said scansion and cyclically moving the latter stream along another dimension to scan said latter stream in said second dimension and thus provide a signal proportional to the intensity of illumination of successive elements of said picture area.

31. In a cathode ray tube wherein the beam thereof is moved to produce scansion of a picture area, a method of scansion which comprises developing a cathode ray stream representative of a picture, cyclically moving said stream at one frequency over an aperture to provide scansion in one dimension only, developing a second cathode ray stream representing the result of said scansion and cyclically moving the latter stream at a different frequency along another dimension to scan said latter stream in said second dimension and thus provide a signal proportional to the intensity of illumination of successive elements of said picture area.

32. In a cathode ray tube television system a method of electronic scansion which comprises developing a cathode ray stream representative of a picture, moving said stream along one dimension only of a picture area to produce separate and alined charges representing the scansion of a single picture area dimension, developing a second cathode ray stream, utilizing said charges to vary the intensity of said second stream, and moving said latter stream along another dimension to provide a signal proportional to the intensity of illumination of successive elements of said picture area.

33. In an electron tube an apertured insulated grid, an electron emitting element to emit a flood of electrons, means to project the emitted flood of electrons through said apertured grid, means to produce on said apertured grid electrostatic charges representative of a picture, a target element located on the side of said apertured grid opposite the source of flooding electrons, and means to focus electrons passing through said grid upon said target.

34. In an electron tube an apertured insulated grid, a thermionic cathode to emit a flood of electrons, means to project the thermionically emitted electrons through said apertured grid, means to produce on said apertured grid electrostatic charges representative of a picture, a target electrode located on the side of said apertured grid opposite said thermionic cathode, and means to focus electrons passing through said grid upon said target.

PHILO T. FARNSWORTH.